United States Patent [19]

Eitel

[11] Patent Number: 4,715,694

[45] Date of Patent: Dec. 29, 1987

[54] BEAM STEERING MIRROR CONSTRUCTION

[75] Inventor: Frederick G. Eitel, Palm Beach, Fla.

[73] Assignee: The United States of America as represented by the Secretary of the Army, Washington, D.C.

[21] Appl. No.: 856,263

[22] Filed: Apr. 28, 1986

[51] Int. Cl.[4] .............................................. G02B 26/10
[52] U.S. Cl. ..................................... 350/486; 350/636
[58] Field of Search ................ 350/486, 636; 248/487, 248/479

[56] References Cited

U.S. PATENT DOCUMENTS 3,857,631 12/1974 Morgenstern et al. ............. 350/636
3,914,029 10/1975 Hoplock ............................. 248/487

Primary Examiner—John K. Corbin
Assistant Examiner—Rebecca D. Gass
Attorney, Agent, or Firm—Freddie M. Bush; James T. Deaton

[57] ABSTRACT

A beam steering mirror is trunnion mounted about a primary axis relative to a ring structure and the ring structure is trunnion mounted on a secondary axis 90° from the axis of the beam steering mirror and in the same plane and the ring structure is trunnion mounted about its secondary axis relative to a stationary support structure, and the ring structure and the beam steering mirror each have electric torque motor actuators for adjusting the beam steering mirror and the ring structure relative to the stationary support structure.

3 Claims, 4 Drawing Figures

BEAM STEERING MIRROR CONSTRUCTION

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

In the past, techniques for reactionless beam steering of laser mirrors have included mounting the mirror and masses for flexure about the center of the mirror. These devices have included a multiplicity of actuators and often as many as can be fitted in the space behind the mirror. Linear magnetic types are the most common. For two-axis control, all actuators must receive signals in response to errors originated in either axis, i.e., the two-axes may not be controlled independently. These devices have very limited control and adjustment of the mirror and therefore a more adaptable mechanism for adjusting the mirror is needed and a way in which the mirror can have a central hole therethrough for allowing a laser output therethrough.

Therefore, it is an object of this invention to provide a beam steering mirror arrangement in which torque actuators are used to adjust the mirror.

Another object of this invention is to utilize a reactionless system that uses as few as two actuators.

A further object of this invention is to provide a mirror system in which a central hole or path can be provided through a mirror itself.

Still another object of this invention is to provide a mirror assembly in which each axis for a two-axis tilt is totally independent to simplify the control system for the actuators.

Yet another object of this invention is to provide an actuator arrangement in which the tilt angle for the mirror is not restricted by and does not compromise actuator radial clearance.

A still further object of this invention is to provide a beam steering mirror construction in which springs are located coaxially with torque motors and attached to the steering mirror at approximately the same location to reduce distortion.

Yet another object of this invention is to provide a mirror configuration that is adaptable to using mirrors that are circular, elliptical, or rectangular.

Other objects and advantages of this invention will be obvious to those skilled in this art.

SUMMARY OF THE INVENTION

In accordance with this invention, a beam steering mirror construction is provided in which a two-axis beam steering mirror is trunnion mounted on a primary axis through its central portion and to a ring structure which in turn is also trunnion mounted about a secondary axis that is located 90° from the first primary axis and in the same plane. Electric motor torque actuators are provided at the axes for the trunnion mountings and spring means fix the mirror static alignment with the electric torque motors serving to adjust the beam steering mirror against the action of the spring means to adjust the beam steering mirror in two axes.

DESCRIPTION OF THE PREFERRED EMBODIMENT

Figure 2:
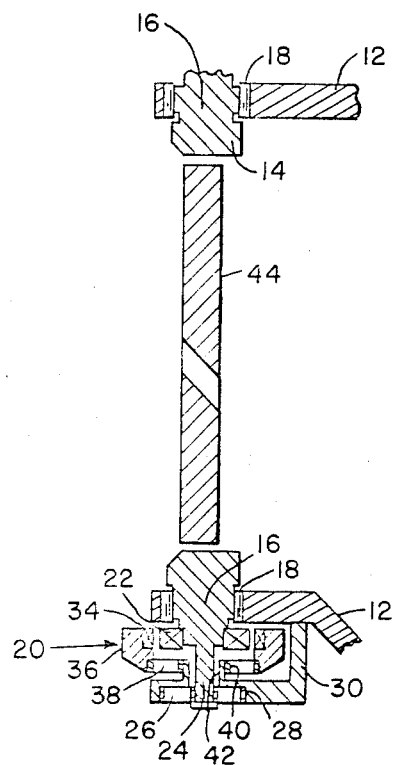
FIG. 2 is a sectional view along line 2—2 of FIG. 1 with duplicated actuator structure at one end cutaway.
Figure 1:
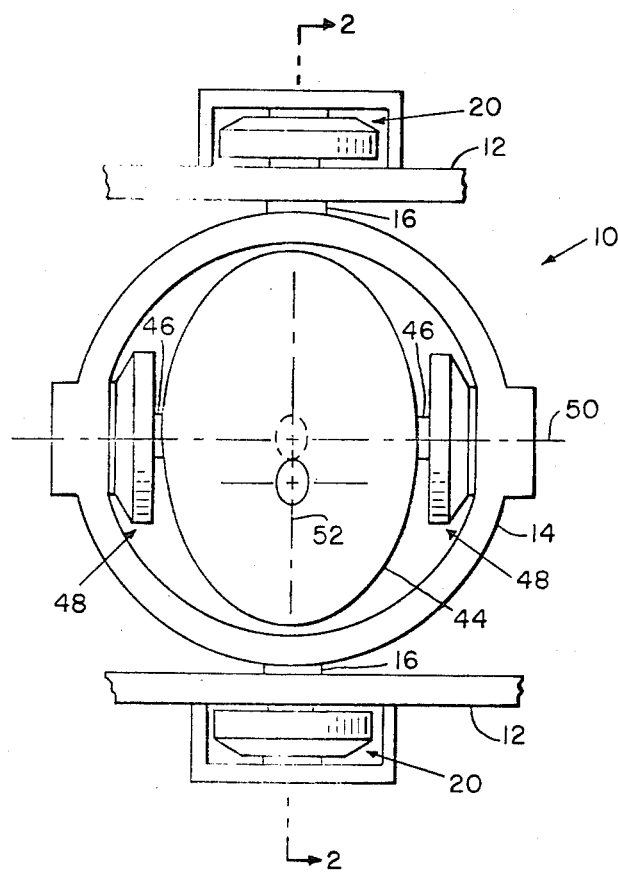
FIG. 1 is a plan view of a beam steering mirror construction in accordance with this invention.
Figure 4:
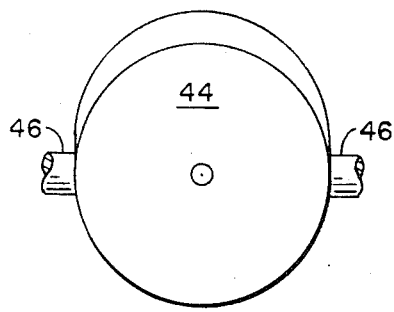
FIG. 3 is a view looking in from one side of the beam steering mirror construction and FIG. 4 is a perspective view of the mirror.
Figure 3:
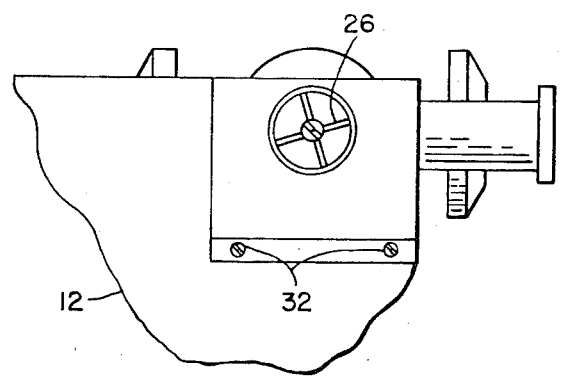

Referring now to the drawing, in FIG. 1 a beam steering mirror construction 10 is illustrated and includes base mount 12 to which a trunnion ring 14 is rotatable through shafts 16 at opposite sides of the ring and shafts 16 are mounted in bearings 18 (See FIG. 2) supported in base structure 12. Bearings 18 are of conventional structure. Electric torque motors 20 at opposite ends and on shafts 16 are provided for adjusting and tilting ring 14 as desired. Each electric torque motor 20 includes an actuator rotor 22 that is secured to a reduced diameter portion of shaft 16 in a conventional manner. A further reduced diameter portion 24 of shaft 16 has a torsion spring 26 (See FIGS. 2 or 3) fixedly secured to reduced diameter portion 24 in a conventional manner. Spring 26 is secured at its outer surface in a conventional and fixed manner to base surface 28 of support structure 30 that is fixed by securing means such as bolts 32 (See FIG. 3) to base structure 12. As can be appreciated, rotory restraint for ring 14 and shafts 16 is imposed by springs 26 which fix ring 14 in static alignment when electric torque motors 20 are not energized. Each electric torque motor 20 also includes actuator stator 34 that is fixedly secured to weighted and tuned counterbalance structure 36 and structure 36 includes an inner diameter that is fixedly secured to torsion or flexure spring 38 that can be of the same shape as spring 26. Spring 38 has an inner diameter portion 40 that is fixedly mounted in a conventional manner to structure 42 of support structure 30. Spring 38 has a spring rate which is counterbalanced by the weighted mass structure 36 to cause actuator moment reactions to be cancelled and eliminate vibratory loads transmitted to base mount structure 12.

Beam steering mirror 44 (See FIG. 1) is trunnion mounted on a primary axis by its centroid shafts 46 that are mounted in trunnion bearings in ring structure 14 in a similar manner to the mounting of bearings 18. Shafts 46 have two electric torque motors mounted for actuation and adjustment of mirror 46. Electric torque motors 48 each have the same structure as that for torque motors 20 and are therefore not illustrated in detail. The stators of torque motors 48 are connected to ring structure 14 in the same manner that stators 34 are connected to support structure 30. Shafts 46 are spring biased with torsion springs at the ends thereof in the same manner that torsion springs 26 bias shafts 16. As will be appreciated, the primary axis 50 of beam steering mirror 44 and secondary axis 52 of ring 14 are 90° apart and in the same plane.

In operation, with ring structure 14 and mirror 44 mounted in position for mirror 44 to generally reflect a beam as desired and by ring 14 and mirror 44 being restrained from rotating only by the torsion springs that fix mirror 44 and ring 14 in a static alignment position when torque actuators 20 and 48 are not energized, the torsion springs serve to establish the initial tilt resident characteristic. Further fine adjustment of mirror 44 is accomplished by applying the appropriate adjustment signals to electric torque motors 20 and 48. When these torques are applied through motors 20 and 48, the stators act through their torsion spring mounting and act upon the rotors against their torsion springs to adjust mirror 44 to the desired position. By mounting the torque motor stators on torsion springs as illustrated and by counterbalancing the stators, actuators moment reaction are cancelled and therefore serve to eliminate vibratory loads which can be transmitted to the base mount and supporting structure if these torsion springs are not provided.

It is also pointed out that mirror 44 can be cooled in any conventional manner such as by introduction of coolant concentric with trunnion axes, or at other radial locations that do not interfere with the actuator.

As will be appreciated, this invention provides for beam steering of a mirror in a simplified manner, a manner which has improved characteristics, and a manner which is adaptable to certain packaging constraints.

I claim:

1. A beam steering mirror construction comprising a beam steering mirror with trunnion mounting shafts projecting from opposite sides thereof for rotation of the beam steering mirror about a primary axis through a centroid of the mirror, a ring structure surrounding said beam steering mirror and trunnion mounting said shafts of said beam steering mirror relative to said ring structure, said ring structure having trunnion mounting shafts projecting therefrom on a secondary axis that is 90° from the trunnion primary axis of said beam steering mirror and said secondary axis being located in the same plane as said primary axis, a set of trunnion bearings mounting said ring structure at said shafts relative to a stationary support structure, electric torque motor actuator means mounted relative to said beam steering mirror shafts and said ring structure for adjusting said beam steering mirror about said primary axis, an electric torque motor actuator means mounted between said trunnion mounting shafts of said ring structure and said stationary support structure for adjusting said ring structure about said secondary axis, and said trunnion mounting shafts of said ring structure and said trunnion mounting shafts of said beam steering mirror each having torsion spring means which spring bias these trunnion mounting shafts for rotary constraints by the torsion spring means.

2. A beam steering mirror construction as set forth in claim 1, wherein said electric torque motor actuator means for said beam steering mirror and said ring structure each have a stator structure that has a torsion spring mounting the stator relative to its support structure.

3. A beam steering mirror construction as set forth in claim 2, wherein said electric torque motor actuator means includes two electric torque motors for actuating said beam steering mirror and two electric torque motors for actuating said ring structure.

* * * * *